United States Patent Office 3,349,214
Patented Oct. 24, 1967

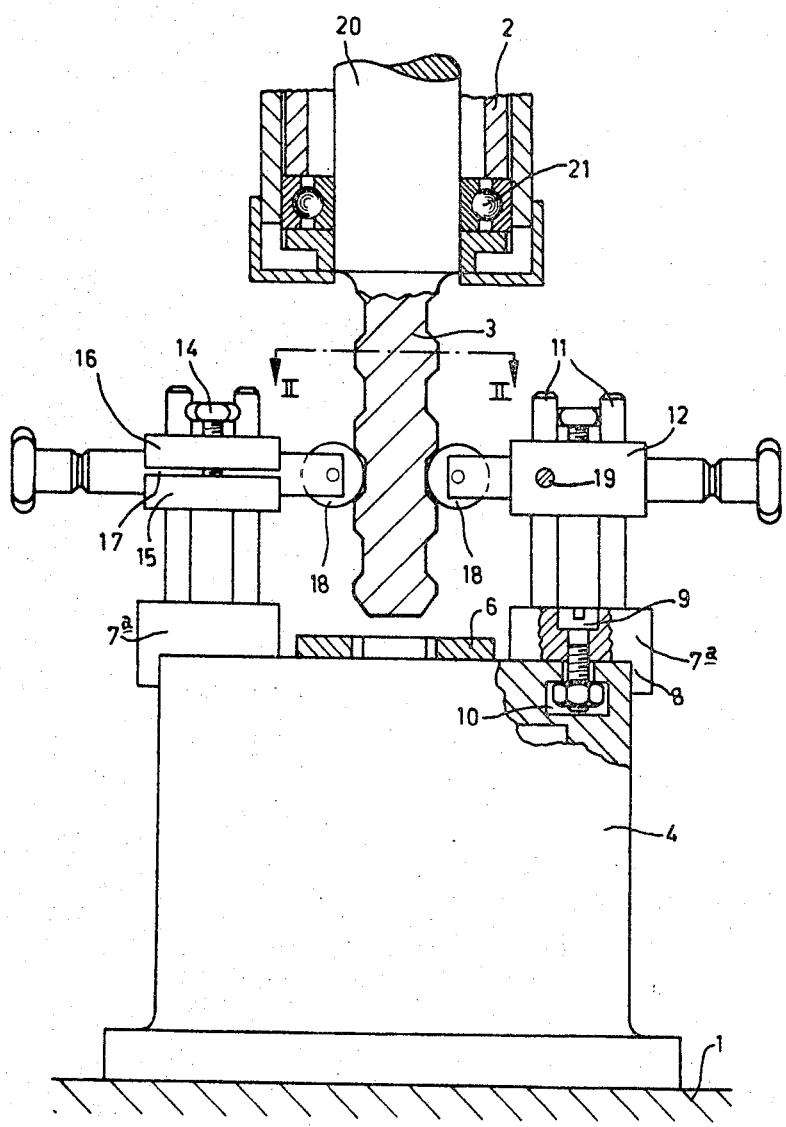

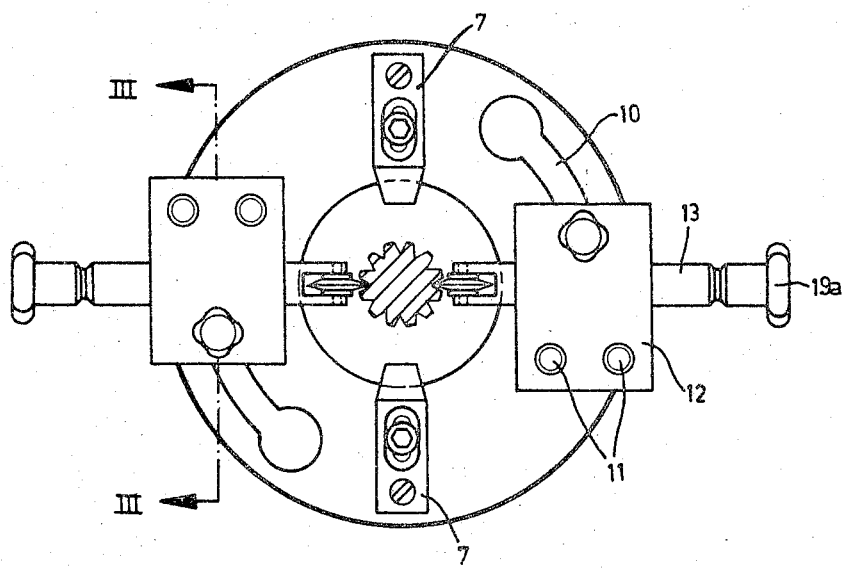
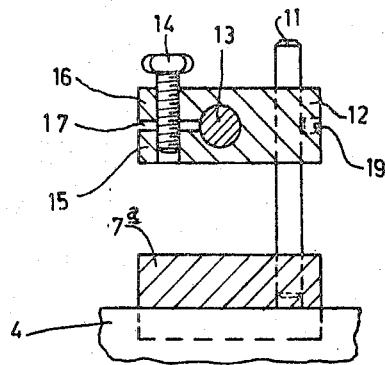

3,349,214
ARRANGEMENT FOR GUIDING THE TOOL-FORMING ELECTRODE OF A MACHINE OPERATING THROUGH ELECTRIC EROSION
Claude Vuilleumier, Sonvilier, Bern, Switzerland, assignor to Société d'Outillage pour Frappe à Chaud S.A., Sonvilier, Switzerland, a firm
Filed June 25, 1964, Ser. No. 377,958
Claims priority, application Switzerland, June 25, 1963, 7,874/63
2 Claims. (Cl. 219—69)

Machines operating through electric erosion allow working extremely hard metal parts by electrically tearing particles out of the latter and they are used chiefly for perforating plates of hard metal or of tungsten or vanadium carbide with a view to preparing dies, moulds, or draw-plates.

The tool used for such operations is constituted by an electrode made of a conductive metal which can be readily machined such as copper alloy and the machines are designed in a manner such that the cross-section of the bore to be obtained corresponds to the cross-section of the electrode.

Various arrangements have been proposed for machining helical grooves. To this end, the tool-forming electrode is given the shape of the desired helicoid and a helical movement of the electrode is produced with reference to the part to be machined.

The helical movement may be obtained through the agency of a stationary nut into which the electrode is screwed during the machining. Said method is however not applicable in the case of helicoid surfaces the slope of which is high with reference to the axis of the electrode and it requires for each electrode the execution of a corresponding nut.

Other machine builders have proposed machines in which the tool-forming electrode is driven on the one hand along a rectilinear path while the part to be machined is given a rotary movement. The combination of said movements constrains thus any point of the electrode to progress along a helical line.

The production and combination of such movements require the presence of gears and the like motion-transmitting parts which jeopardize the accuracy and the grade of operation of the machine.

The present invention has now for its object a machine operating through electric erosion and wherein the cylindrical tool-forming electrode provided with helical grooves is fitted interchangeably on an electrode carrier and is adapted to rotate and to move axially with reference to the latter. According to the present invention, the electrode is guided by two supports the position of which may be angularly shifted round the axis of the electrode, each support carrying a carrier member adapted to be vertically shifted and provided with a horizontal bore; inside the latter may slide and revolve a spindle provided at its end facing the electrode with a roller adapted to engage one of the helical grooves of the latter whereby these two rollers positioned in diametrically opposite relationship guide said electrode in a manner such that any rectilinear axial movement of the electrode-carrier produces a helical movement of the electrode so that it is thus possible for the latter to produce bores provided with helical grooves.

The accompanying drawings illustrate by way of examples a preferred embodiment of the invention; in said drawings:

FIG. 1 is a partly sectional side view of the machine,
FIG. 2 is a view from above, the electrode being sectionalized along line II—II of FIG. 1.

FIG. 3 is a cross-section through line III—III of FIG. 2.

Turning to FIG. 1, the machine operating through electric erosion includes a working table 1, an electrode-carrier 2 and a tool-forming electrode 3 fitted interchangeably on said carrier.

The tool-forming electrode is guided by an arrangement including a pedestal 4 through which it is secured to the machine table, said pedestal carrying the part 6 to be machined, which part is held fast by clamping members 7. The pedestal also carries two supports 7a constituted each by a shoe provided with a shoulder 8 engaging the periphery of the pedestal 4 while screws such as 9 extend through the shoes and engage nuts housed inside a semi-circular groove 10 the cross-section of which is in the shape of an inverted T. The supports are thus guided during their movements and are rigidly secured to the pedestal through a mere screwing home of the screws 9.

Two parallel cylindrical uprights 11 are fitted in each support and form vertical guides for the carrier members 12. Each member 12 is provided with a bore extending radially with reference to the electrode, in which a horizontal spindle 13 is adapted to move translationally along its axis and to rotate round said axis. Said spindle may be rigidly secured to the corresponding carrier-member 12 upon screwing home of the screw 14 urging towards each other the two sections 15 and 16 of said carrier member, which sections are separated by a horizontal slot 17. The carrier member is in its turn rigidly secured to the uprights 11 by the screwing home of at least one transverse screw 19.

Each horizontal spindle 13 carries at its end facing the axis of the arrangement a roller 18 adapted to revolve without any clearance on said spindle 13 while the other end of the spindle carries control knob 19a.

The peripheral outline of said rollers matches the cross-section of the electrode grooves in a radial plane so that a fraction at least of said rollers may engage said grooves in tangent relationship therewith.

The electrode 3 which is clamped by a screw on a shaft 20 fitted in ball-bearings of which one is shown at 21 revolves thus freely round its axis.

The position of the rollers being adjusted so that they may engage the grooves in the electrode, each point of the electrode is subjected during the vertical movement of the electrode-carrier to a movement along a helical path defined by the combination of the rectilinear movement of the electrode-carrier and of the rotary movement imparted to the electrode by the engagement of its grooves by the rollers.

The arrangement described allows forming through electric erosion helical grooves while allowing large possibilities of adjustment in a manner such that a same implementing allows guiding electrodes of very different cross-sections of which the threads, the number of which may be odd or even, may be given very different pitches. Furthermore, the rollers behave by reason of the rigidity of the structure, as a rim absorbing the clearances in the bearings of the electrode-carrier and increase thereby the grade and accuracy of machining.

What I claim is:

1. In a machine operating through electric erosion and adapted to produce bores provided with helical grooves, the combination of a frame adapted to carry a work piece, an electrode-carrier rigid with said frame above the location of the work, and provided with a vertical bore registering vertically with the location of the work piece to be machined, an electrode revolvably and axially shiftable in said bore, means for moving said electrode axially inside said bore, at least two supports rigidly secured to the frame and provided each with a bore the axis of which extends radially with reference to the axis of the bore in the electrode-carrier, a spindle adjustably fitted in the bore in each support, rollers carried by said spindles and engaging snugly the cooperating grooves of the electrode and constraining said electrode to rotate round its axis proportionally to its axial progression.

2. In a machine operating through electric erosion and adapted to produce bores provided with helical grooves, the combination of a frame adapted to carry a work piece and provided with an arcuate groove, an electrode-carrier rigid with said frame above the location of the work piece to be machined, an electrode revolvably and axially shiftable in said bore, means for moving said electrode axially inside said bore, two supports adapted to be secured adjustably in said grooves, a spindle carrier rigidly secured to each support and provided with a horizontal bore, the axis of which crosses the vertical axis of the bore in the electrode carrier and is aligned with that of the spindle carrier rigid with the other support, a spindle carried in the bore in each carrier and adapted to be secured therein in the desired angular and axial position, a roller revolvably carried at the end of each spindle facing said axis and engaging snugly the cooperating groove of the electrode and constraining said electrode to rotate round its axis proportionally to its axial progression.

No references cited.

RICHARD M. WOOD, *Primary Examiner.*

R. F. STAUBLY, *Assistant Examiner.*